(12) United States Patent
Ohtomo et al.

(10) Patent No.: US 9,007,461 B2
(45) Date of Patent: Apr. 14, 2015

(54) AERIAL PHOTOGRAPH IMAGE PICKUP METHOD AND AERIAL PHOTOGRAPH IMAGE PICKUP APPARATUS

(71) Applicant: Kabushiki Kaisha TOPCON, Itabashi-ku (JP)

(72) Inventors: Fumio Ohtomo, Asaka (JP); Hitoshi Otani, Tokyo-to (JP); Kazuki Osaragi, Tokyo-to (JP); Tetsuji Anai, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 375 days.

(21) Appl. No.: 13/669,583

(22) Filed: Nov. 6, 2012

(65) Prior Publication Data

US 2013/0135440 A1 May 30, 2013

(30) Foreign Application Priority Data

Nov. 24, 2011 (JP) ................................. 2011-255996

(51) Int. Cl.
*H04N 7/18* (2006.01)
*H04N 13/02* (2006.01)
(Continued)

(52) U.S. Cl.
CPC ............... *H04N 13/02* (2013.01); *G01C 11/06* (2013.01); *G05D 1/0094* (2013.01); *H04N 13/0221* (2013.01); *G06T 7/0028* (2013.01); *G06T 7/0075* (2013.01); *G06T 2200/32* (2013.01);
(Continued)

(58) Field of Classification Search
USPC .............. 348/46, 144; 345/419; 382/154, 159
See application file for complete search history.

(56) References Cited

U.S. PATENT DOCUMENTS

| 4,005,818 A | 2/1977 | Krause et al. |
| 4,359,733 A | 11/1982 | O'Neill |

(Continued)

FOREIGN PATENT DOCUMENTS

| EP | 1659365 A1 | 5/2006 |
| JP | 5-24589 A | 2/1993 |

(Continued)

OTHER PUBLICATIONS

Extended European Search Report mailed May 23, 2013 in co-pending European patent application No. EP 12165456.

(Continued)

*Primary Examiner* — Sath V Perungavoor
*Assistant Examiner* — Nathnael Aynalem
(74) *Attorney, Agent, or Firm* — Nields, Lemack & Frame, LLC

(57) ABSTRACT

The aerial photograph image pickup method comprises a first step of acquiring still images along an outward route and a return route respectively, a second step of preparing a stereo-image with regard to three images adjacent to each other in advancing direction, and of preparing another stereo-image by relative orientation on one more set of adjacent images and of preparing two sets of stereo-images, a third step of connecting two sets of stereo-images by using feature points extracted from a portion of an image common to the two sets of stereo-images, a step of connecting all stereo-images in the outward route direction and in the return route direction according to images acquired in the first step by repeating the second and third steps, and a step of selecting common tie points from the images adjacent to each other in the adjacent course and connecting the adjacent stereo-images in the course.

10 Claims, 10 Drawing Sheets

(51) Int. Cl.
| | |
|---|---|
| *G01C 11/06* | (2006.01) |
| *G05D 1/00* | (2006.01) |
| *G06T 7/00* | (2006.01) |
| *G03B 15/00* | (2006.01) |
| *G03B 35/02* | (2006.01) |
| *G03B 37/02* | (2006.01) |
| *G06K 9/00* | (2006.01) |

(52) U.S. Cl.
CPC ............... *G06T 2207/10016* (2013.01); *G06T 2207/10032* (2013.01); *G06T 2207/30181* (2013.01); *G03B 15/006* (2013.01); *G03B 35/02* (2013.01); *G03B 37/02* (2013.01); *G06K 9/0063* (2013.01)

(56) References Cited

U.S. PATENT DOCUMENTS

| | | | |
|---|---|---|---|
| 4,404,553 | A | 9/1983 | Cuffia |
| 4,490,028 | A | 12/1984 | Kucher |
| 5,235,513 | A | 8/1993 | Velger et al. |
| 5,490,075 | A | 2/1996 | Howard et al. |
| 5,559,510 | A | 9/1996 | Strong, III et al. |
| 5,986,581 | A | 11/1999 | Magdaleno, II et al. |
| 6,006,158 | A | 12/1999 | Pilley et al. |
| 6,084,510 | A | 7/2000 | Lemelson et al. |
| 6,193,190 | B1 | 2/2001 | Nance |
| 6,405,975 | B1 | 6/2002 | Sankrithi et al. |
| 6,442,293 | B1 * | 8/2002 | Ito et al. .......... 382/154 |
| 6,608,559 | B1 | 8/2003 | Lemelson et al. |
| 6,626,078 | B2 | 9/2003 | Thornton |
| 6,694,064 | B1 | 2/2004 | Benkelman |
| 6,731,331 | B1 * | 5/2004 | Watabe et al. ........ 348/144 |
| 6,995,792 | B1 | 2/2006 | Ogura |
| 7,010,401 | B1 | 3/2006 | Richburg et al. |
| 7,391,340 | B2 | 6/2008 | Malhomme |
| 7,418,320 | B1 | 8/2008 | Bodin et al. |
| 7,552,025 | B2 | 6/2009 | Ohtomo et al. |
| 7,590,484 | B2 | 9/2009 | Gellert |
| 7,666,682 | B2 | 2/2010 | Armentrout et al. |
| 7,671,998 | B2 | 3/2010 | Ohtomo et al. |
| 7,725,257 | B2 | 5/2010 | Strelow et al. |
| 7,726,033 | B2 | 6/2010 | Ohtomo et al. |
| 7,755,513 | B2 | 7/2010 | Wang et al. |
| 7,804,996 | B2 | 9/2010 | Ohtomo et al. |
| 8,078,349 | B1 | 12/2011 | Prada Gomez et al. |
| 8,218,131 | B2 | 7/2012 | Otani et al. |
| 8,422,777 | B2 | 4/2013 | Aller |
| 8,422,825 | B1 | 4/2013 | Neophytou et al. |
| 8,589,071 | B2 | 11/2013 | Feyereisen et al. |
| 8,630,755 | B2 | 1/2014 | Ohtomo et al. |
| 8,666,571 | B2 | 3/2014 | Ohtomo et al. |
| 2002/0085094 | A1 | 7/2002 | Teuchert |
| 2002/0089588 | A1 | 7/2002 | LeCompte |
| 2002/0163582 | A1 * | 11/2002 | Gruber et al. ............ 348/218.1 |
| 2004/0041999 | A1 | 3/2004 | Hogan et al. |
| 2004/0073578 | A1 * | 4/2004 | Nam et al. ................. 707/104.1 |
| 2004/0234122 | A1 * | 11/2004 | Kochi et al. .................. 382/154 |
| 2004/0264763 | A1 * | 12/2004 | Mas et al. ..................... 382/154 |
| 2005/0084975 | A1 | 4/2005 | Armentrout et al. |
| 2005/0125142 | A1 | 6/2005 | Yamane |
| 2005/0165517 | A1 | 7/2005 | Reich |
| 2005/0286760 | A1 | 12/2005 | Ohtomo et al. |
| 2006/0239539 | A1 | 10/2006 | Kochi et al. |
| 2007/0025595 | A1 | 2/2007 | Koizumi et al. |
| 2007/0093945 | A1 | 4/2007 | Grzywna et al. |
| 2007/0127101 | A1 | 6/2007 | Oldroyd |
| 2008/0059065 | A1 | 3/2008 | Strelow et al. |
| 2008/0063299 | A1 * | 3/2008 | Murai et al. ................. 382/284 |
| 2008/0071431 | A1 | 3/2008 | Dockter et al. |
| 2008/0075325 | A1 | 3/2008 | Otani et al. |
| 2008/0111815 | A1 | 5/2008 | Graves et al. |
| 2008/0298638 | A1 | 12/2008 | Miyazaki |
| 2009/0015685 | A1 | 1/2009 | Shulman |
| 2009/0087029 | A1 | 4/2009 | Coleman et al. |
| 2009/0122133 | A1 | 5/2009 | Hartman |
| 2009/0306840 | A1 | 12/2009 | Blenkhorn et al. |
| 2010/0013927 | A1 | 1/2010 | Nixon |
| 2010/0033371 | A1 | 2/2010 | Kumagai et al. |
| 2010/0070111 | A1 | 3/2010 | Akcasu |
| 2010/0277587 | A1 * | 11/2010 | Pechatnikov et al. ......... 348/144 |
| 2010/0295855 | A1 * | 11/2010 | Sasakawa et al. ............. 345/427 |
| 2011/0049290 | A1 | 3/2011 | Seydoux et al. |
| 2011/0090337 | A1 | 4/2011 | Klomp et al. |
| 2011/0196598 | A1 | 8/2011 | Feyereisen et al. |
| 2011/0307126 | A1 | 12/2011 | Hogstrom |
| 2012/0007982 | A1 | 1/2012 | Giuffrida et al. |
| 2012/0078451 | A1 | 3/2012 | Ohtomo et al. |
| 2012/0173053 | A1 | 7/2012 | Ohtomo et al. |
| 2012/0200703 | A1 * | 8/2012 | Nadir et al. .................... 348/144 |
| 2012/0215388 | A1 | 8/2012 | Pepitone et al. |
| 2012/0249739 | A1 * | 10/2012 | Gostynski et al. ............. 348/46 |
| 2012/0261516 | A1 | 10/2012 | Gilliland et al. |
| 2012/0277934 | A1 | 11/2012 | Ohtomo et al. |
| 2012/0300070 | A1 | 11/2012 | Ohtomo et al. |
| 2013/0062457 | A1 | 3/2013 | Deakin |
| 2013/0142500 | A1 | 6/2013 | Yavin |
| 2014/0055613 | A1 | 2/2014 | Ohtomo et al. |
| 2014/0119716 | A1 | 5/2014 | Ohtomo et al. |

FOREIGN PATENT DOCUMENTS

| | | |
|---|---|---|
| JP | 8-159762 A | 6/1996 |
| JP | 8-285588 A | 11/1996 |
| JP | 2662111 B2 | 10/1997 |
| JP | 9-302628 A | 11/1997 |
| JP | 2000-85694 A | 3/2000 |
| JP | 2000-280995 A | 10/2000 |
| JP | 2001-39397 A | 2/2001 |
| JP | 2004-245741 A | 9/2004 |
| JP | 2005-115623 A | 4/2005 |
| JP | 2006-10376 A | 1/2006 |
| JP | 2006-500266 A | 1/2006 |
| JP | 3808833 B2 | 8/2006 |
| JP | 2007-171048 A | 7/2007 |
| JP | 2008-76303 A | 4/2008 |
| JP | 2009-33366 A | 2/2009 |
| JP | 4253239 B2 | 4/2009 |
| JP | 2010-38822 A | 2/2010 |
| JP | 2011-86895 A | 4/2011 |
| JP | 2011-89895 A | 5/2011 |
| JP | 2012-71645 A | 4/2012 |
| JP | 2012-140101 A | 7/2012 |
| JP | 2012-232654 A | 11/2012 |
| JP | 2012-242321 A | 12/2012 |
| WO | 2004/027434 A1 | 4/2004 |
| WO | 2008/152740 A1 | 12/2008 |

OTHER PUBLICATIONS

Office Action mailed Jul. 16, 2013 in co-pending U.S. Appl. No. 13/453,242.

Office Action mailed Jul. 2, 2014 in co-pending U.S. Appl. No. 13/453,242.

Office Action mailed Aug. 12, 2014 in co-pending U.S. Appl. No. 13/473,659.

Final Rejection mailed Jun. 30, 2014 in co-pending U.S. Appl. No. 14/059,784.

Office Action mailed Jul. 11, 2014 in co-pending U.S. Appl. No. 14/059,784.

Japanese communication issued Oct. 24, 2014 in co-pending Japanese patent application No. 2011-101913.

European communication completed Oct. 22, 2014 in co-pending European patent application No. 12168267.8.

(56) References Cited

OTHER PUBLICATIONS

European communication mailed Nov. 3, 2014 in corresponding European patent application No. EP 12193419.4.
Notice of Allowance mailed Nov. 3, 2014 in co-pending U.S. Appl. No. 14/059,784.
Final Rejection mailed Feb. 11, 2014 in co-pending U.S Appl. No. 13/453,242.
Office Action mailed Mar. 20, 2014 in co-pending U.S. Appl. No. 14/059,784.

* cited by examiner

PHOTOGRAPHING IN CONVENTIONAL CASE
OVERLAP:60%
SIDELAP:30%

PHOTOGRAPHING PROPOSED BY THE INVENTION
OVERLAP:80%
SIDELAP:50%

S1-S2 LEFT MODEL
S2-S3 RIGHT MODEL

LEFT MODEL   RIGHT MODEL

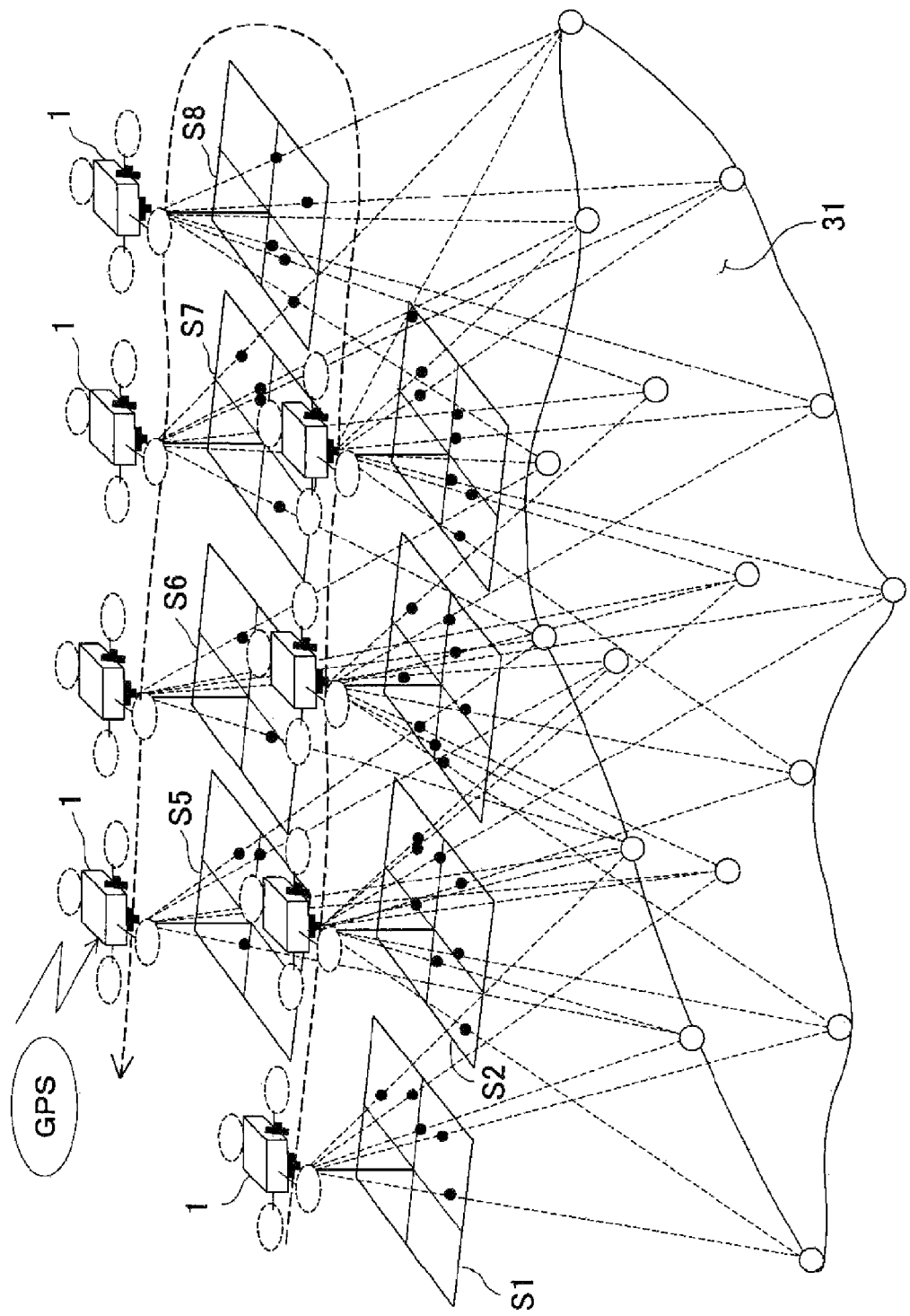

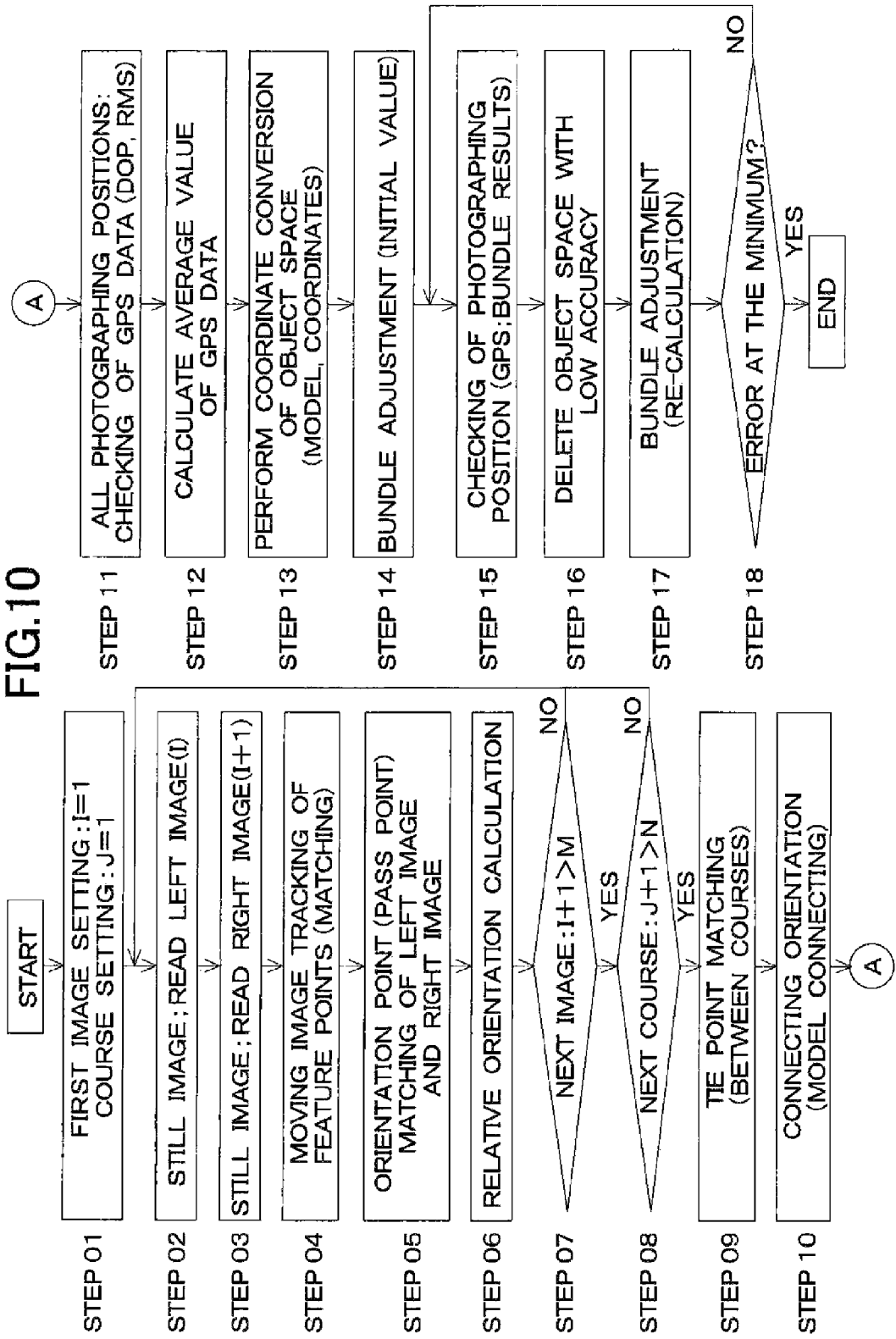

AERIAL PHOTOGRAPH IMAGE PICKUP METHOD AND AERIAL PHOTOGRAPH IMAGE PICKUP APPARATUS

BACKGROUND OF THE INVENTION

The present invention relates to an aerial photograph image pickup method and an aerial photograph image pickup apparatus by a small type Unmanned Aerial Vehicle (UAV).

In a photographing operation from the air above or a surveying from the air above, information which cannot be acquired by the photographing operation from the ground or by the surveying on the ground can be acquired, and the photographing operation is possible in an off-limits area, or the information in an area where the surveying is difficult can be acquired. Further, in recent years, by the improvement in performance of a small type flying object as remote controlled such as a tiny plane or a small-scale helicopter, etc. and also, by the improvement in a remote control technology, and further, the improvement in performance of an image pickup device, the promotion of the miniaturization, and others, the image pickup device can be mounted in a small flying object. By remotely controlling the flying object, the photographing operation from the air above can be performed in an unmanned manner.

Further, it is also possible to perform autonomous flight according to a flight schedule as set up in advance. By setting three-dimensional position for taking aerial photograph in advance, it is possible to acquire still images from a predetermined position. Also, digital photogrammetry can be performed from the still images.

On the other hand, in a case where the photographing operation is performed by a small flying object, it is desirable that the helicopter body is in horizontal posture. In fact, however, the helicopter body is often tilted because the helicopter body is light in weight, and the body is often swept away by the wind. Therefore, in a fixedly mounted image pickup device, an optical axis is tilted depending on a state of the body, and a tilt direction may not be constantly fixed.

In case of preparing an image in wide range, or in case of preparing a stereoscopic image, two images adjacent to each other are overlapped, connecting points (tie points) common to the two images are extracted in the overlapped portions, and the images are combined by using the tie points as reference.

However, as described above, when the images taken in a state that an optical axis is tilted and a tilt angle or a tilt direction is not fixed are sequentially combined with each other, a resultant image in the extensive range which can be acquired is distored or curved and there is a problem that a correct combined image cannot be obtained. Also, distortion or curving of the image may exert influence on the accuracy of the digital photogrammetry.

SUMMARY OF THE INVENTION

It is an object of the present invention to provide an aerial photograph image pickup method and an aerial photograph image pickup apparatus, which are simple in arrangement and which can perform accurate three-dimensional measurement of topographical features.

To attain the above object, an aerial photograph image pickup method according to the present invention comprises a first step of acquiring still images along an outward route and a return route respectively when a flying object flies in meandering manner up in the sky over an object range to be measured, a second step of preparing a stereo-image by relative orientation on one set of images adjacent to each other with regard to three images adjacent to each other in advancing direction, and of preparing another stereo-image by relative orientation on one more set of adjacent images and of preparing two sets of stereo-images, a third step of connecting two sets of stereo-images by using feature points extracted from a portion of an image common to two sets of stereo-images and the portion is an overlapped portion of the three images all together, a step of connecting all stereo-images in outward route direction and in return route direction according to images acquired in the first step by repeating the procedures of the second step and the third step, a step of selecting common tie points from the images adjacent to each other in the adjacent course and of connecting the adjacent stereo-images in the course, and the aerial photograph image pickup method prepares an unified stereo-image which covers the entire object range to be measured and is represented by common three-dimensional coordinate system.

Further, in the aerial photograph image pickup method according to the present invention, an overlapping ratio overlapped in advancing direction is 70% to 90%, and a sidelapping ratio overlapped between the courses adjacent to each other is 40% to 60%.

Further, in the aerial photograph image pickup method according to the present invention, feature points extracted from a still image are identified in an adjacent still image by the moving image tracking.

Further, in the aerial photograph image pickup method according to the present invention, multi-image matching is performed on three images adjacent to each other along a course, and a stereo-image in the adjacent course is connected.

Further, in the aerial photograph image pickup method according to the present invention, a still image photographing position is measured by a GPS device, model coordinates of a predetermined point on an object to be measured are determined based on coordinate value obtained by the measurement and based on the unified stereo-image, and the coordinate value obtained by the measurement is corrected by bundle adjustment based on the model coordinates and on the unified stereo-image.

Further, in the aerial photograph image pickup method according to the present invention, the flying object has hovering function, the still image is acquired in hovering condition, a multiple of measurement values are acquired by the GPS device, and the coordinate value is an average of the measured values.

Further, in the aerial photograph image pickup method according to the present invention, for correction of the coordinate values, a photographing position is calculated by using the model coordinates, and a measured value within a predetermined threshold value is selected by comparing with the measured value of the GPS device at the photographing position, and calculation is carried out by using the measured value thus selected.

Further, an aerial photograph image pickup apparatus according to the present invention comprises a flying object, a GPS device provided on the flying object, an image pickup device for taking an image below the flying object, and a control device for controlling the flight of the flying object and for controlling image pickup of the image pickup device, and in the aerial photograph image pickup apparatus, the control device controls the flying object to fly in meandering manner and controls the image pickup device to acquire still images in an outward course and in a return course and controls so that the images have a predetermined overlapping ratio in advancing direction, and so that the image has a predetermined sidelapping ratio between the courses adjacent to each other, and a still image pickup position is measured by the GPS device, and results of measurement are acquired by associating with the still images.

Further, in the aerial photograph image pickup apparatus according to the present invention, the control device controls the flying object in hovering condition where the still images are acquired, and a multiple of results of measurement can be acquired on the image pickup position by the GPS device.

Furthermore, the aerial photograph image pickup apparatus according to the present invention further comprises a data processing device, and the data processing device prepares stereo-images by sequentially performing relative orientation based on two images adjacent to each other in advancing direction, connects two sets of stereo-images by using feature points extracted from a portion of an image common to adjacent stereo-images which is an overlapped portion of three images constituting both of the stereo-images, selects tie points from an overlapped portion of the images adjacent to each other in an adjacent course, connects an adjacent stereo-image along the course based on a tie point, and prepares a unified stereo-image which covers the entire object range to be measured and is represented by a common three-dimensional coordinate system.

According to the present invention, an aerial photograph image pickup method comprises a first step of acquiring still images along an outward route and a return route respectively when a flying object flies in meandering manner up in the sky over an object range to be measured, a second step of preparing a stereo-image by relative orientation on one set of images adjacent to each other with regard to three images adjacent to each other in advancing direction, and of preparing another stereo-image by relative orientation on one more set of adjacent images and of preparing two sets of stereo-images, a third step of connecting two sets of stereo-images by using feature points extracted from a portion of an image common to two sets of stereo-images and the portion is an overlapped portion of the three images all together, a step of connecting all stereo-images in outward route direction and in return route direction according to images acquired in the first step by repeating the procedures of the second step and the third step, a step of selecting common tie points from the images adjacent to each other in the adjacent course and of connecting the adjacent stereo-images in the course, and the aerial photograph image pickup method method prepares an unified stereo-image which covers the entire object range to be measured and is represented by common three-dimensional coordinate system. As a result, it is possible to carry out stereo-measurement on an arbitrary point in the entire object range to be measured.

Further, according to the present invention, in the aerial photograph image pickup method as described above, wherein an overlapping ratio overlapped in advancing direction is 70% to 90%, and a sidelapping ratio overlapped between the courses adjacent to each other is 40% to 60%. As a result, it is possible to improve the accuracy for connection of the stereo-images in advancing direction and between the courses and to prepare a unified stereo-image with high accuracy.

Further, according to the present invention, in the aerial photograph image pickup method as described above, wherein feature points extracted from a still image are identified in an adjacent still image by the moving image tracking. As a result, feature points can be easily identified, and a multiple number of feature points can be extracted.

Further, according to the present invention, in the aerial photograph image pickup method as described above, wherein multi-image matching is performed on three images adjacent to each other along a course, and a stereo-image in the adjacent course is connected. As a result, mis-matching is prevented.

Further, according to the present invention, in the aerial photograph image pickup method as described above, wherein a still image photographing position is measured by a GPS device, model coordinates of a predetermined point on an object to be measured are determined based on coordinate value obtained by the measurement and based on the unified stereo-image, and the coordinate value obtained by the measurement is corrected by bundle adjustment based on the model coordinates and on the unified stereo-image. As a result, it is possible to make up for insufficiency and unstableness of an accuracy of the GPS device.

Further, according to the present invention, in the aerial photograph image pickup method as described above, wherein the flying object has hovering function, the still image is acquired in hovering condition, a multiple of measurement values are acquired by the GPS device, and the coordinate value is an average of the measured values. As a result, it is possible to make up for insufficiency and unstableness of the accuracy of the GPS device.

Further, according to the present invention, in the aerial photograph image pickup method as described above, wherein, for correction of the coordinate values, a photographing position is calculated by using the model coordinates, and a measured value within a predetermined threshold value is selected by comparing with the measured value of the GPS device at the photographing position, and calculation is carried out by using the measured value thus selected. As a result, the measurement values with serious measurement errors can be avoided, and the accuracy of the measurement can be improved.

Further, according to the present invention, the aerial photograph image pickup apparatus comprises a flying object, a GPS device provided on the flying object, an image pickup device for taking an image below the flying object, and a control device for controlling the flight of the flying object and for controlling image pickup of the image pickup device, and in the aerial photograph image pickup apparatus, the control device controls the flying object to fly in meandering manner and controls the image pickup device to acquire still images in an outward course and in a return course and controls so that the images have a predetermined overlapping ratio in advancing direction, and so that the image has a predetermined sidelapping ratio between the courses adjacent to each other, and a still image pickup position is measured by the GPS device, and results of measurement are acquired by associating with the still images. As a result, it is possible to cover the entire object range to be measured, and to prepare a unified stereo-image represented by a common three-dimensional coordinate system.

Further, according to the present invention, in the aerial photograph image pickup apparatus as described above, wherein the control device controls the flying object in hovering condition where the still images are acquired, and a multiple of results of measurement can be acquired on the image pickup position by the GPS device. As a result, it is possible to make up for insufficiency and unstableness of the accuracy of the GPS device.

Furthermore, according to the present invention, the aerial photograph image pickup apparatus as described above further comprises a data processing device, and the data processing device prepares stereo-images by sequentially performing relative orientation based on two images adjacent to each other in advancing direction, connects two sets of stereo-images by using feature points extracted from a portion of an image common to adjacent stereo-images which is an overlapped portion of three images constituting both of the stereo-images, selects tie points from an overlapped portion of the images adjacent to each other in an adjacent course, connects an adjacent stereo-image along the course based on a tie point, and prepares a unified stereo-image which covers the entire object range to be measured and is represented by a common three-dimensional coordinate system. As a result, it is possible to carry out stereo-measurement on an arbitrary point in the entire object range to be measured.

BRIEF DESCRIPTION OF THE DRAWINGS

FIG. 8 is an explanatory drawing to show a state that the flying object acquires still images while flying.

FIG. 10 is a flow chart to show a flow of data processing.

DETAILED DESCRIPTION OF THE PREFERRED EMBODIMENTS

By referring to the attached drawings, description will be given below on an embodiment of the present invention.

First, in FIG. 1, description will be given below on a flight control system of a flying object, which the present invention is applied to.

Figure 1:
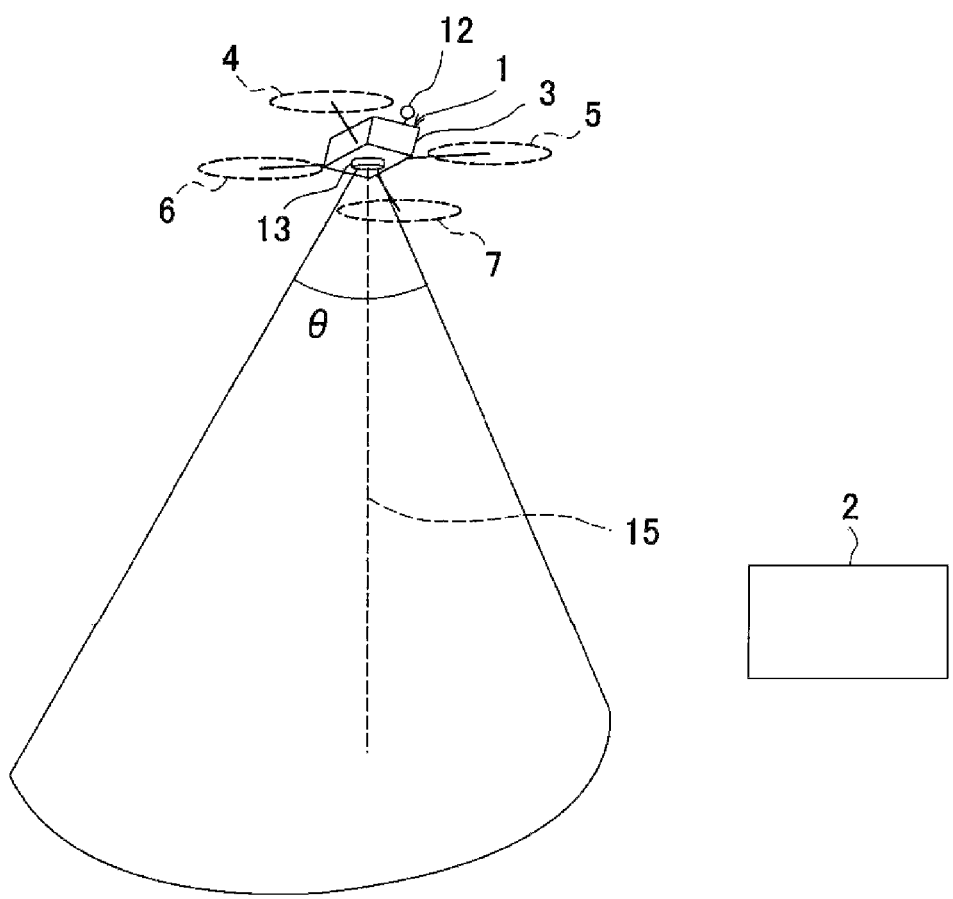
FIG. 1 is a schematical drawing to show a small type flying object according to an embodiment of the present invention.

In FIG. 1, the reference numeral 1 represents an flying object which can make an autonomous flight, and the reference numeral 2 represents a base control device installed on the ground. The base control device 2 can perform the data communication with the flying object 1, and controls a flight of the flying object 1, executes setting and change of flight plan and also, the base control device 2 can store and manage the information collected by the flying object 1. Further, according to the information stored, three-dimensional measurement within an object range to be measured is executed.

The flying object 1 is, e.g., a helicopter as a small flying object for making autonomous flight. The helicopter 1 is operated by remote control from the base control device 2, or the flight plan is set in a control device (as described later) of the helicopter 1 from the base control device 2, and autonomous flight is carried out according to the flight plan.

The helicopter 1 has a helicopter body 3 and a necessary number of propellers provided to the helicopter body 3, e.g., four propellers, i.e., front, rear, left and right propellers 4, 5, 6, and 7. The propellers 4, 5, 6, and 7 are individually coupled with a first motor 8, a second motor 9, a third motor 10, and a fourth motor 11 (as described later) respectively, and driving of each of the first motor 8, the second motor 9, the third motor 10, and the fourth motor 11 can be independently controlled as described later. It is to be noted that the propellers 4, 5, 6, and 7 and the first motor 8, the second motor 9, the third motor 10, and the fourth motor 11, and others constitute a navigation means for the flying object 1.

A GPS device 12, a control device, and at least one image pickup device 13 are installed on the helicopter body 3 of the helicopter 1. In the GPS device 12 to be used in the present embodiment, real time kinematic GPS (i.e. RTK-GPS) is used, for one example.

The GPS device 12 is arranged so as to measure a reference position, e.g. a mechanical center, of the helicopter 1. The GPS device 12 also measures absolute three-dimensional coordinates of the reference position, and the measured value indicates ground coordinate system and altitude as obtained from geocentric coordinate system (absolute coordinate system).

The image pickup device 13 acquires a digital image and outputs a digital signal as image signal. The image pickup device 13 may be a camera for taking the still images at predetermined time intervals, or a video camera for continuously taking the images. At least one of the image pickup devices 13 is mounted on a lower surface of the helicopter body 3. Another image pickup device 13 for taking images in forward direction may be added.

Further, as an image pickup element, the image pickup device 13 has a CCD and a CMOS sensor which are aggregations of pixels, and a center of the image pickup element (a coordinates center of a photodetection surface) coincides with an optical axis 15 of the image pickup device 13. Each pixel in the image pickup element can identify a position (coordinates) on the image pickup element. Furthermore, a field angle of each pixel (i.e. an angle between a ray entering the pixel through an image-forming lens and the optical axis 15) can be identified from the coordinates.

The optical axis 15 runs through a reference position (e.g. the mechanical center) of the helicopter body 3, and the optical axis 15 is set in such a manner that the optical axis 15 coincides with a vertical line when the helicopter 1 takes a horizontal posture. The image pickup device 13 has a view angle of an angle θ and can acquire the images for aerial photograph. Therefore, the image pickup device 13 can acquire images within the range of the view angle θ as required immediately below the helicopter 1, and the center of the image coincides with the reference position. The images taken by the image pickup device 13 are also used as image data for the positional measurement as described later.

The image taken by the image pickup device 13 is associated with time for taking the image, with geocentric coordinates (three-dimensional coordinates) measured by the GPS device 12 and is stored in a storage unit 18 as described later.

Figure 2:
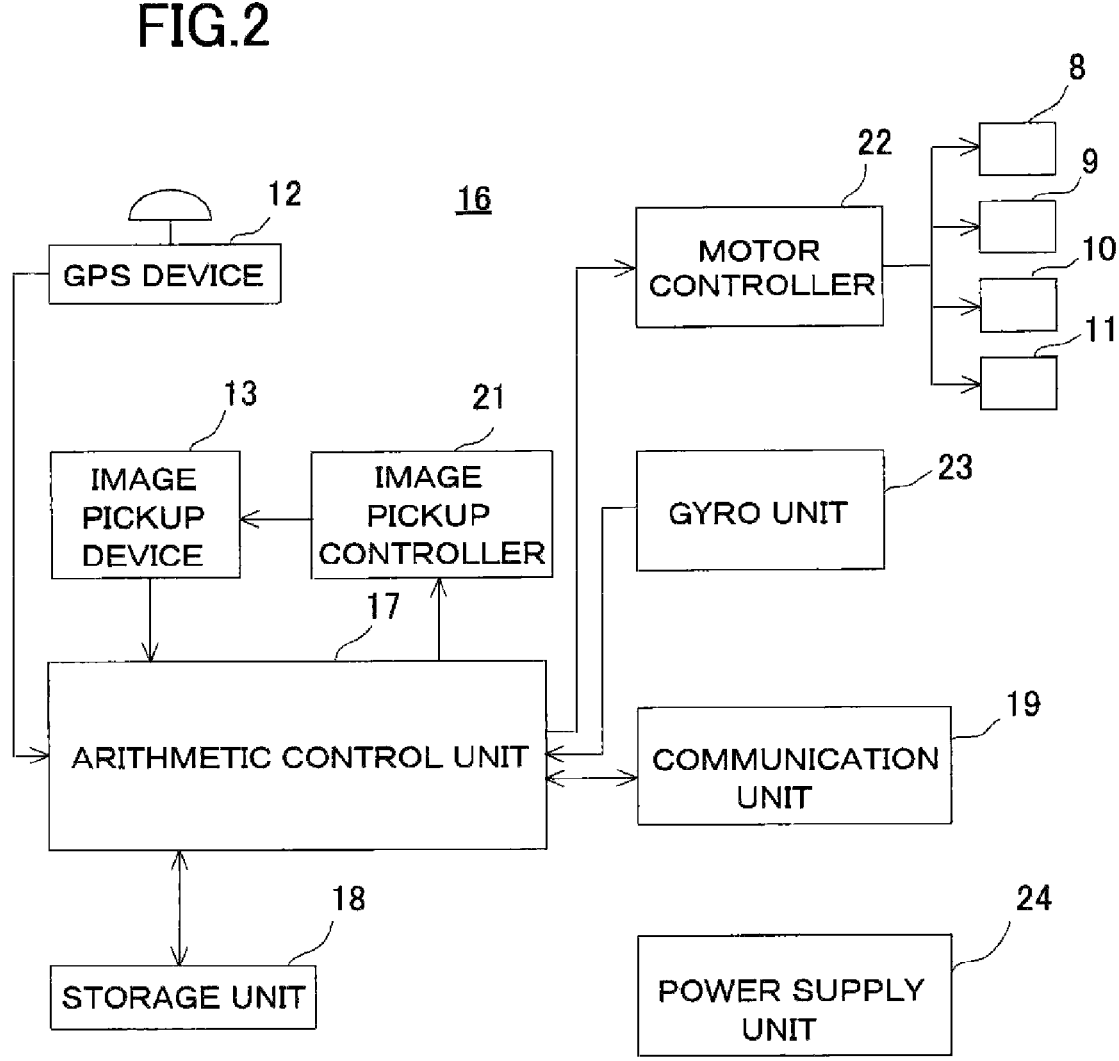
FIG. 2 is a schematical block diagram of a control device installed on the flying object.

FIG. 2 shows a control device 16 provided in the helicopter body 3. The control device 16 is mainly constituted of an arithmetic control unit 17, a storage unit 18, a communication unit 19, an image pickup controller 21, a motor controller 22, a gyro unit 23, and a power supply unit 24.

In the storage unit 18, the image acquired by the image pickup device 13 and a time at which the image was acquired are stored in such a manner that the time associated with the image. Further, the three-dimensional coordinates of the helicopter 1 are measured by the GPS device 12 in synchronization with the time at which the image was acquired, and the three-dimensional coordinates as measured are also associated with the time at which the image was acquired and stored in the storage unit 18.

In the storage unit 18, various types of programs: an image pickup control program, an image processing program, a tracking processing program, a three-dimensional position measuring program, a matching processing program, a computation program, a flight guiding program, a flight control program, a flight posture control program, a communication control program, a bundle adjustment program, etc. are stored. Further, in the storage unit 18, the image taken by the image pickup device 13, a time of image pickup, and the three-dimensional coordinates when the image was acquired are associated with the image and are stored and flight plan data are also stored. The data stored in the flight plan data are, for instance, flying course, flying altitude, places and range to be photographed, etc. Further, the bundle adjustment program may be stored in the storage unit on the base control device 2 side and the bundle adjustment may be carried out at the base control device 2 after the helicopter 1 makes a predetermined flight and predetermined data are acquired.

Based on the position of the helicopter 1 measured by the GPS device 12, on a flight velocity of the helicopter 1, and on the view angle θ of the image pickup device 13 etc., the image pickup control program controls the acquisition timing of the image data taken by the image pickup device 13 in such a manner that the images adjacent to each other in terms of time overlap at a predetermined rate and that the images taken at vertexes (as described later) adjacent to each other overlap at a predetermined rate. When performing the image tracking, the image pickup device 13 is controlled so that the image pickup device 13 takes the image at the predetermined time intervals between the image data and the next image data acquired. Moving images may be acquired as images for tracking to be acquired between the image data and the next image data.

The image processing program executes the image processing, e.g., extracting feature points (tie points) from the image acquired by the image pickup device 13 or, combining a plurality of images with the tie points as reference.

Further, the tracking processing program performs the image tracking of the feature points between the images adjacent to each other in terms of time and specifies the feature points of the image into the next image one after another. It is to be noted that the image tracking is disclosed in the Patent Document 2 or in the Patent Document 3.

The three-dimensional position measuring program calculates a height distance of the helicopter 1 (a reference position) according to a measurement method, e.g., the digital photogrammetry or the like based on the ground coordinates obtained by the measurement of the GPS device 12 and based on the tie points extracted from the images of the image pickup device 13. Therefore, as the height of the helicopter 1, there can be obtained two types of height, i.e., a first height distance obtained by the measurement of the GPS device 12, and a second height distance obtained based on the images by the digital photogrammetry.

The flight control program is a program for controlling flying condition such as the flight velocity, ascending speed, descending speed, flying direction, flying altitude, etc., and for making the helicopter 1 fly along a predetermined flying course, at the altitude and the speed as preset. The flying posture control program is a program for controlling to make the helicopter 1 in flight keep in a horizontal posture or for controlling to make the helicopter 1 fly in standstill state (hovering).

The matching processing program sequentially performs matching or stereo-matching between still images (adjacent to each other in terms of time), and combines images in a predetermined measurement range. The computation program is a program to execute coordinate conversion or relative orientation calculation, etc. necessary for the matching processing.

The bundle adjustment program is a program to simultaneously acquire photographing position and tilting (external orientation elements) of each of the images by the least square method based on the three-dimensional coordinates of the feature point extracted from the image and on three-dimensional coordinates already known or obtained by the measurement.

The arithmetic control unit 17 controls image pickup of the image pickup device 13 via the image pickup controller 21 according to the image pickup control program and carries out image tracking according to the tracking processing program. Then, the arithmetic control unit 17 extracts the tie points and combines a plurality of images and further, calculates a second height distance according to the three-dimensional position measuring program.

Also, the arithmetic control unit 17 individually drives and controls the first motor 8, the second motor 9, the third motor 10, and the fourth motor 11 via the motor controller 22 based on the flight control program and the flight plan data and makes the helicopter 1 fly at altitude and speed as preset in the predetermined flying course. The arithmetic control unit 17 also controls the helicopter 1 in horizontal position during the flight and maintains the helicopter 1 in standstill flying (hovering) condition at the predetermined position by controlling the first motor 8, the second motor 9, the third motor 10, and the fourth motor 11 via the motor controller 22 according to the flying posture control program and based on the signals from the gyro unit 23.

The communication unit 19 receives a remote flight control command from the ground base and communicates the flight condition of the helicopter 1 to the ground base. Also, the communication unit 19 gives and takes information between the ground base and the helicopter 1 via communication means such as wireless LAN or Bluetooth (registered trademark) etc. For instance, under the condition that the helicopter 1 is landed at the base, the flight plan data are transmitted from the base to the helicopter 1, or information of images, positions and times as taken during the flight are transmitted to the base from the helicopter 1.

The power supply unit 24 is e.g., a chargeable battery, which can be replaced. When the helicopter 1 lands on the base, the consumed battery is replaced with a battery already charged, and the consumed battery is recharged until the next replacement. During the flight, the power supply unit 24 supplies electric power to the first motor 8, the second motor 9, the third motor 10, and the fourth motor 11 via the motor controller 22 and supplies the necessary electric power to the image pickup device 13, the image pickup controller 21, the arithmetic control unit 17, and the communication unit 19.

The images acquired by the image pickup device 13, the positional information measured by the GPS device 12, and the information of the tie point are communicated to the base control device 2 via the communication unit 19. The base control device 2 prepares a combined image of a wider range based on the images, and also prepares a stereo-image, or, performs the digital photogrammetry based on the stereo-image. Based on the coordinates of the feature points extracted from the images, bundle adjustment is carried out.

Now, description will be given below on operation of an embodiment according to the present invention.

First, referring to FIG. 3, description will be given on the flying method in the present embodiment.

The helicopter flies in meandering manner in the sky over the object range to be measured, and acquires still images along an outward route and a return route respectively.

The helicopter 1 flies along the outward route over the object range to be measured, makes U-turn at a terminal of the outward flight, and flies along the return route in parallel to the course of the outward flight. The helicopter 1 makes U-turn at the end of the return flight and again flies along the outward route. The outward flight and the return flight are repeatedly carried out, and the flight is deviated by a certain interval between the outward route and the return route. The flying distance of the outward flight and the return flight should be a distance to fly across the object range to be measured at least along a straight line. During the flight, the helicopter 1 takes still images at predetermined time interval so that the entire object range to be measured is included in the combined image when all of the still images as taken are combined.

In this case, all of the still images are combined to have a single combined image including the entire object range to be measured. In the present embodiment, a multi-image matching is performed as described below.

Figure 4A:
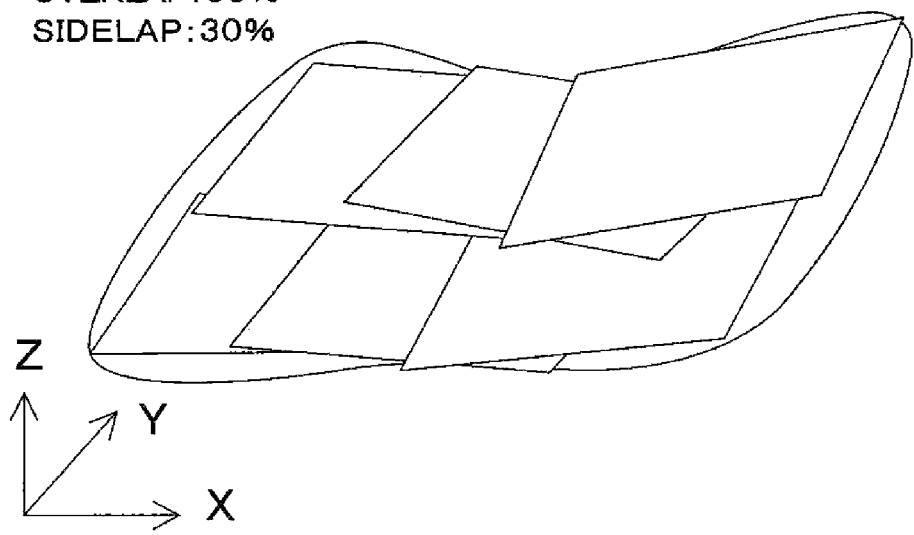
FIG. 4A is an explanatory drawing to show an overlapping ratio and a sidelapping ratio of images according to a conventional example.

Combining of a plurality of images has also been performed in the past. As shown in FIG. 4A, images adjacent to each other in terms of time in advancing direction are overlapped in an amount as required (hereinafter, referred as "overlapping"), and the images in adjacent course are also overlapped in an amount as required (hereinafter, referred as "sidelap"). Then, matching of all images is performed and images are combined by using the overlapped portions of all of the images.

Figure 4B:
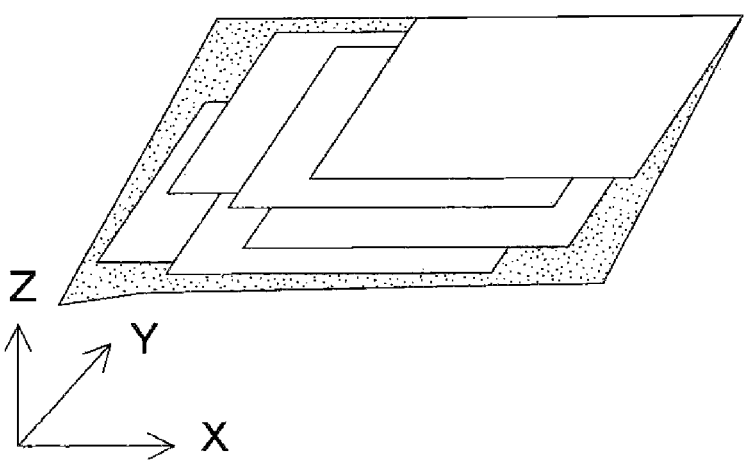
FIG. 4B is an explanatory drawing to show an overlapping ratio and a sidelapping ratio of images according to the present embodiment.

FIG. 4B shows the condition of superimposing of the images in the present embodiment. In the present embodiment, the overlapping ratio is set to 70% to 90%, and the sidelapping ratio is set to 40% to 60%, and the overlapping ratio and the sidelapping ratio are increased when compared with the conventional case. In the following, description will be given on a case where the overlapping ratio is set to 80% and the sidelapping ratio is set to 50% as an example. The overlapping ratio in the conventional case is about 60% and the sidelapping ratio is about 30%.

Figure 3:
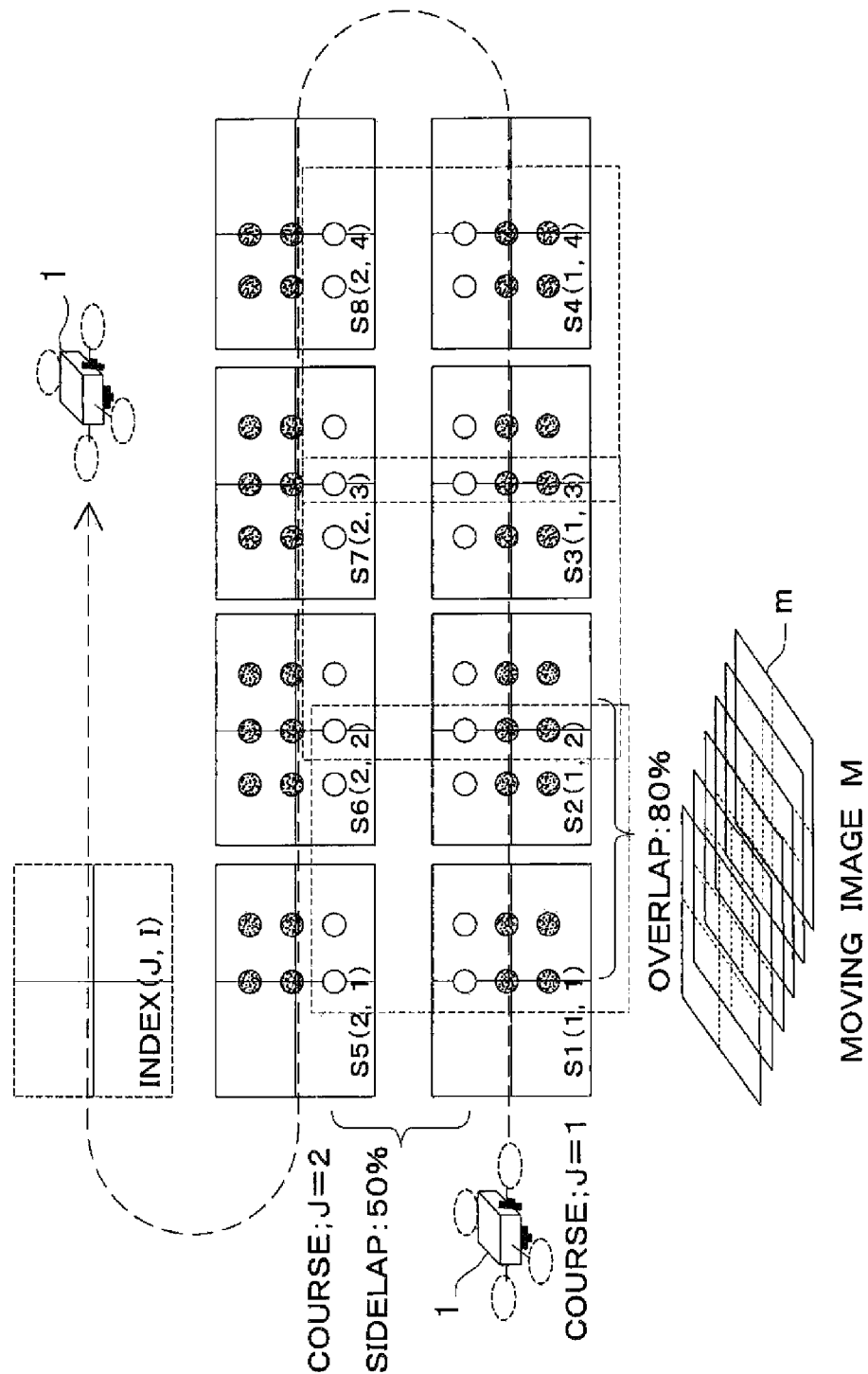
FIG. 3 is an explanatory drawing to show a relation between flying course of the flying object and taken images.

Referring to FIG. 3, description will be given below on the acquisition of the still images. In FIG. 3, to facilitate the explanation, the images adjacent to each other are shown as separated from each other. Actually, however, the overlapping ratio is 80% between the images, which are adjacent to each other in terms of time in the flying direction, and the sidelapping ratio is 50% between the images in the courses adjacent to each other. The image pickup controller 21 controls the image pickup timing of the image pickup device 13 in such a manner that the overlapping ratio and the sidelapping ratio will be 80% and 50% respectively based on the measuring position of the GPS device 12 and based on the flight velocity of the helicopter 1.

In FIG. 3, reference symbol Sn represents a still image, reference symbol n represents a serial number of the still image, reference symbol J represents a serial number of the flying course, and reference symbol I represents a number, which is repeated for each course. Therefore, reference symbols (such as j and I) as added to the still image S each represents a position (address number) of the still image to be combined.

A predetermined still image is regarded as a reference image (still image S1 at the starting point is shown in the figure), the feature points to perform image matching are extracted from the reference image, and the feature point needs to be identified in the images adjacent to each other. In the present embodiment, the feature points are sequentially identified by the moving image matching. The still image is acquired, and a moving image M is obtained until the time when the next still image is acquired, and tracking of the feature point is performed for each one frame "m" of the moving image M.

As shown in FIG. 4B, in the present embodiment, 80% of the images adjacent to each other in terms of time, i.e. in advancing direction are overlapped. Therefore, as to three images adjacent to each other whose portion overlapped in common is 60%. as many feature points as required common to the three images are extracted from the overlapped portions of 60%, e.g. 50 (5×10) points are extracted, and matching (multi-image matching) is performed on these three images. Further, sequential multi-image matching is performed on the three images adjacent to each other, and an image including the entire object range to be measured is combined.

As to be described later, it is so arranged that the more the feature points to be used for the matching there are, the higher the accuracy of the digital photogrammetry will be. Programming is carried out to extract many feature points so that many feature points are obtained automatically.

Between the adjacent images in the courses adjacent to each other, the sidelapping ratio is 50%. Thus, similarly as to these three images, the feature points in common are extracted from the overlapped portions of the three images, and the multi-image matching is performed on the three images.

Figure 5:
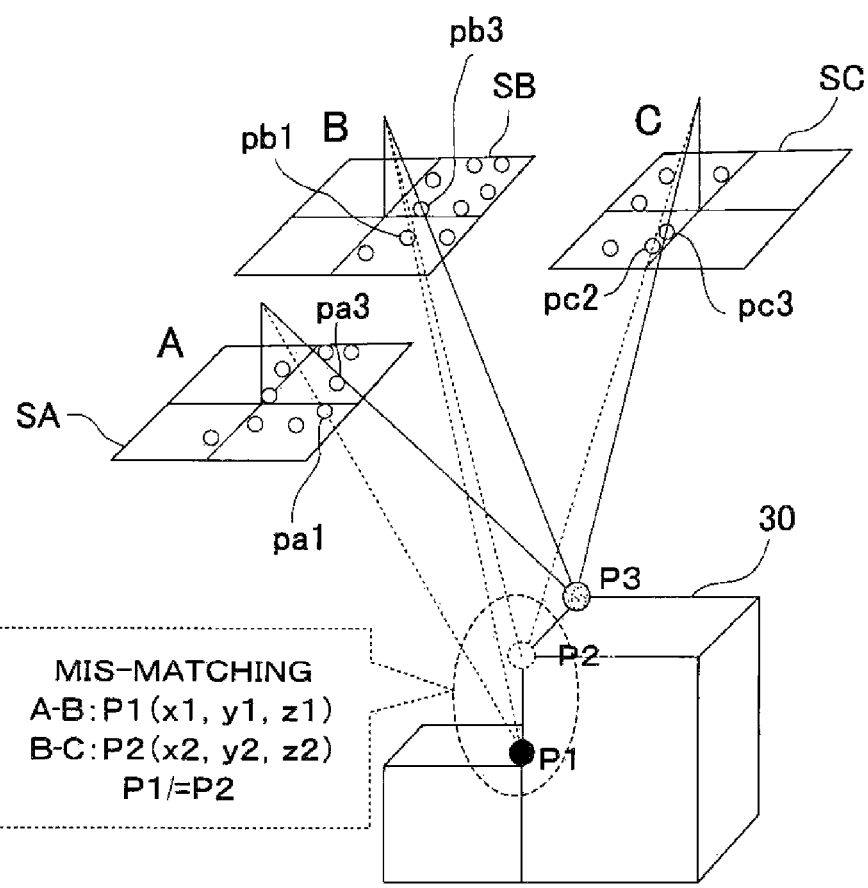
FIG. 5 is an explanatory drawing of a multi-image matching.

FIG. 5 is a schematical drawing of the multi-image matching, and description will be given below on the multi-image matching by referring to FIG. 5. FIG. 5 shows a case where the multi-image matching is performed on three still images of images SA, SB and SC, which are acquired at photographing positions of A, B and C respectively. The photographing positions A, B and C are measured by the GPS device 12, and it is assumed that a distance between the photographing positions A and B and a distance between the photographing positions B and C are already known respectively.

By using two still images, stereo-measurement (digital photogrammetry) can be carried out. For instance, by using the images SA and SB or the images SB and SC, stereo-measurement is carried out respectively.

For instance, in a case where a feature point P1 of an object to be measured 30 is to be determined, three-dimensional measurement can be performed from coordinates (pa1, pb1) of each of the feature point P1, which can be specified in the two images SA and SB respectively. When the stereo-measurement is performed in the images SB and SC, the feature point P1 cannot be seen from the image SC, and a feature point P2 may be measured erroneously. Also, the feature point P2 can be seen from the image SB, and coordinates of the feature point P2 can be measured from the stereo-image SB-SC (i.e. coordinates pb2 and pc2).

In such case, coordinates of height are apparently different between the coordinates of the feature point P1 measured in the stereo-image SA-SB and the coordinates of the feature point P2 measured in the stereo-image SB-SC, and it can be easily judged that the feature point P1 is not a feature point common to the images SA, SB and SC.

Next, the feature point P3 can be seen commonly from the photographing positions A, B and C. If the stereo-measurement is performed on the feature point P3 from the stereo-image SA-SB and the stereo-image SB-SC respectively among the images SA, SB and SC as acquired at the photographing positions A, B and C respectively, measurement can be made on these stereo-images as the same coordinates.

That is, if the coordinates of the feature point as measured in two sets of the stereo-images are the same, it can be recognized as the feature point common to the three images of SA, SB and SC.

Figure 6:
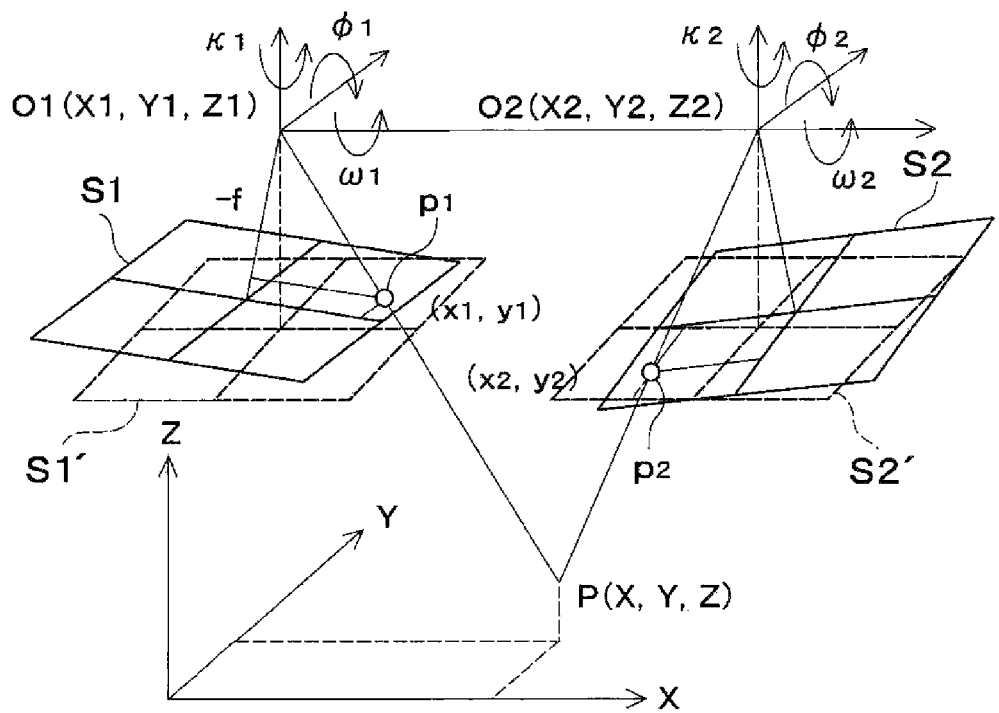
FIG. 6 is a explanatory drawing about a relative orientation.

Next, FIG. 6 shows a case where the stereo-image is prepared from the two still images S1 and S2.

In a case where a stereo-image is prepared from two images, as shown in the drawing, projection center of a left image is regarded as the origin of model coordinate system, and a line connecting the left image projection center and the projection center of a right image is regarded as X-axis. In this case, difference of the coordinate system between the left image and the right image will be five rotation angles: rotation angles $\kappa1$ and $\phi1$ of the left image, and rotation angles $\kappa2$, $\phi2$ and $\omega2$ on the right side. That is, 5 rotation angles in all. Therefore, it is necessary to have five orientation points (pass points) in order to perform the matching (stereo-matching) by coordinate conversion of the images at left and right.

The common feature points p1 and p2 corresponding to the point P to be measured are extracted from both images. Further, by extracting at least five of the common feature points (e.g. p1 and p2), the feature points are regarded as orientation points, and the stereo-matching (relative orientation) can be performed on the left image and the right image based on the feature points.

Also, by the stereo-image obtained by the stereo-matching, it is possible to measure image pickup positions O1 and O2 of each of the still images S1 and S2.

Figure 7A:
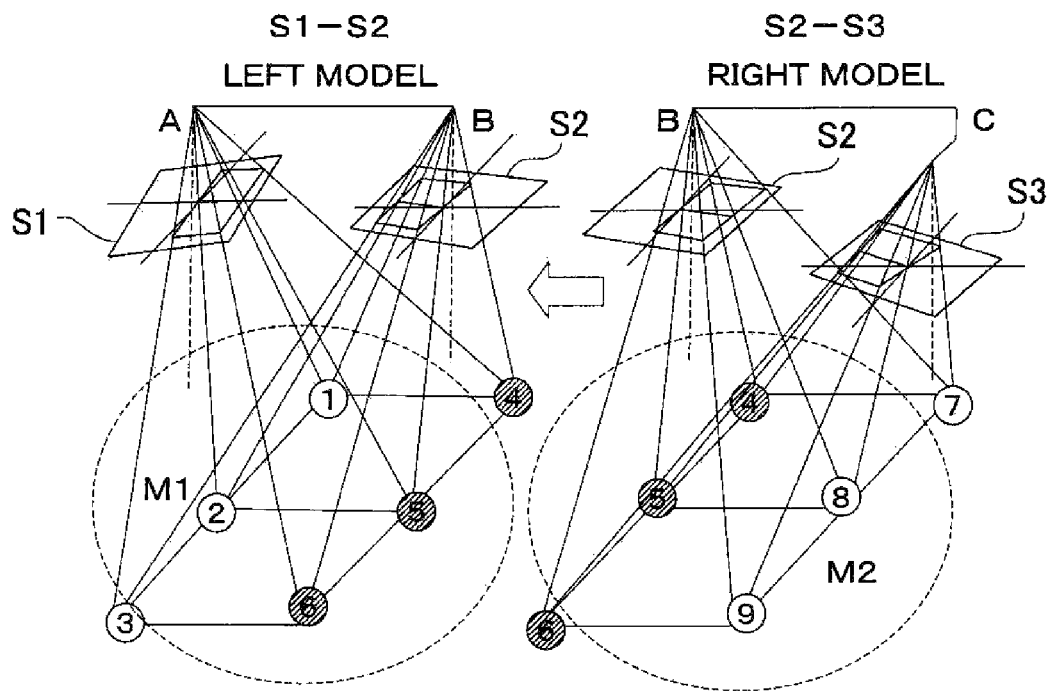
FIG. 7A is a schematical drawing to explain the relative orientation of each of two images being adjacent to each other and preparation of two sets of stereo-images.
Figure 7B:
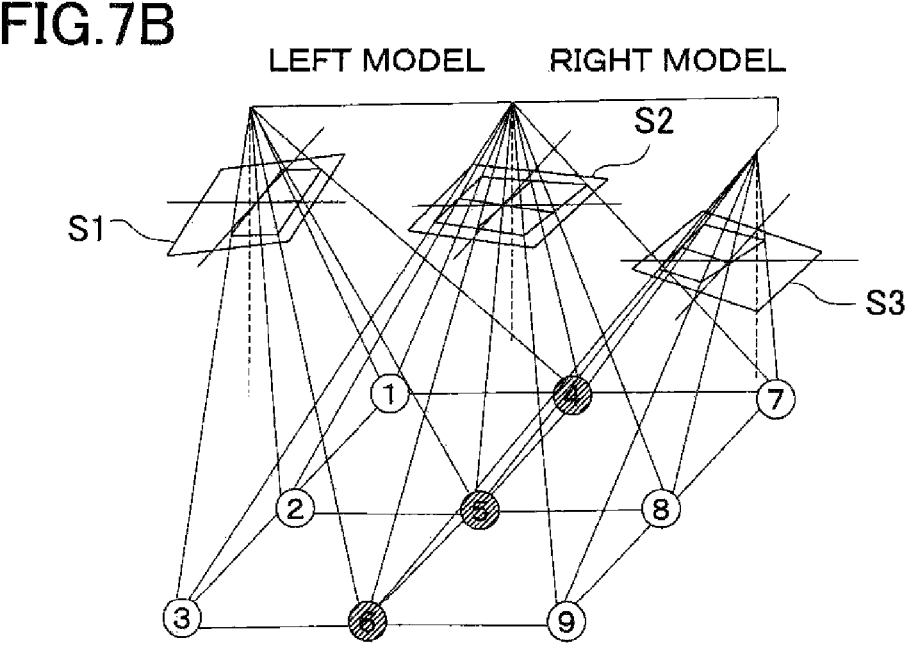
FIG. 7B is a schematical drawing to show a case where two sets of stereo-images are connected with each other.

Further, FIG. 7A and FIG. 7B each represents a case where two sets of stereo-images are prepared from the three still images S1, S2 and S3 as acquired at the photographing points A, B and C respectively, and two sets of the stereo-images are connected.

Among the still images S1, S2 and S3, the stereo-matching (relative orientation) is performed based on the orientation points (1) to (6) by the two still images S1 and S2 at left, and a left stereo-image (left model) is prepared. The left stereo-image can be recognized as a stereoscopic image of the left three-dimensional coordinate system. Similarly, by two images S2 and S3 at right side, the stereo-matching is performed according to the orientation points (4) to (9), and a right stereo-image (right model) and right three-dimensional coordinates are prepared.

The feature points to be used for the preparation of the left stereo-image are extracted from a portion where the two still images S1 and S2 are overlapped on each other. The feature points to be used for the preparation of the right stereo-image are extracted from a portion where two images S2 and S3 are overlapped on each other.

Further, when the left stereo-image is to be connected with the right stereo-image, the image S2, which is common to the left stereo-image and the right stereo-image, is used. Then, by coordinate conversion of the right stereo-image (i.e. by three-dimensional coordinates) using the left stereo-image (i.e. left three-dimensional coordinates) as reference, both stereo-images are connected with each other.

For the purpose of connecting, at least three connecting points (tie points) are needed. As these connecting points, the feature points (4) to (6) extracted from a portion where three images are overlapped all together are used. As the connecting points, the feature points used as the orientation points when the stereo-image is prepared may be used.

The orientation points and the connecting points are the feature points, which are extracted from the portion where three images are overlapped all together. By performing the multi-image matching as described above, it is possible to confirm whether the extracted feature points have adaptability as the orientation points and the connecting points, and mis-matching can be prevented.

The number of the orientation points is 5 points at the minimum in a case where the stereo-image is prepared, and the number of the connecting points is 3 points at the minimum when the left stereo-image and the right stereo-image are connected with each other. The more the number of the orientation points and the connecting points there are, the higher the accuracy can be improved.

As described above, the overlapping ratio of the images adjacent to each other in advancing direction is 60% in the conventional case, while the overlapping ratio common to the three images adjacent to each other comes to be 20%.

On the other hand, in the present embodiment, in a case where the overlapping ratio is 80%, for instance, the commonly overlapping ratio in three images adjacent to each other comes to be 60%. In a case where the feature points are extracted at the same distribution ratio (distribution density) in the conventional case and in the present embodiment, the number of the feature points in the present embodiment will be three times more compared with the conventional case. Also, it is known that the orientation accuracy is improved in proportion to square root of the number of the feature points. In the present embodiment, the accuracy is improved by $\sqrt{3}$ times.

Further, as for the tie points to be used in a case where two images are coupled together, the longer a distance (a span) between the tie points is, the more the tilting between the two images can be suppressed in proportion to the length. In simple calculation, when the overlapping ratio is increased by three times, the highest span of the tie points will be $\sqrt{3}$ times, and tilting error will be $1/\sqrt{3}$.

Therefore, in the present embodiment, if it is supposed that the number of the feature points is increased in proportion to the overlapping ratio of the images, the accuracy will be improved by $\sqrt{3}\times\sqrt{3}$: that is, by 3 times.

Further, when the number of the feature points is increased by about 10 times compared with the conventional case, the accuracy is improved by $\sqrt{10}\times\sqrt{3}\approx5.5$ times.

By referring to FIG. 3, the stereo-image is prepared by the two images adjacent to each other in terms of time as describe above, and further, connection is sequentially carried out between the stereo-images adjacent to each other. Then, a row of the stereo-images connected in advancing direction is prepared. Further, the stereo-images of the courses adjacent are connected by the multi-image matching from three or more images belonging to the adjacent courses, and all stereo-images are finally connected with each other. When all of the stereo-images are connected (i.e. when coordinates conversion is performed in a standard coordinate system), unified stereo-images (unified model) which covers the entire range including all object to be measured and is represented by a common three-dimensional coordinate system (unified three-dimensional coordinates) is prepared.

By selecting 10 or more tie points automatically, it is possible to prepare the unified stereo-images represented by common three-dimensional coordinate system.

FIG. 8 shows how the still images S1 to S8 are acquired while the helicopter 1 is flying. As described above, the feature points are extracted on each of the still images. Moving images are acquired between each of the still images, and image tracking is performed on the feature points through the moving images. The position of the point where the still image is acquired is measured by the GPS device 12.

As described above, real time kinematic GPS (RTK-GPS) is used in the present embodiment. In general, the accuracy of RTK-GPS is: flat surface 10 mm and height 20 mm. However, the accuracy of the GPS device 12 may be unstable depending on the number of satellites of GPS, the arrangement of the satellites, ionosphere, multi-pass, etc. Also, depending on the time of photographing and photographing position, the accuracy of the GPS device 12 differs for each frame (for each image).

In the present embodiment, it is tried to improve the measurement accuracy of the GPS device 12 and to prevent deterioration of accuracy (non-stabilization) of the GPS data, and coordinate conversion to geocentric coordinates (absolute orientation) of the stereo-image group is carried out according to the results of measurement on accurate photographic position by the GPS device 12.

Figure 9:
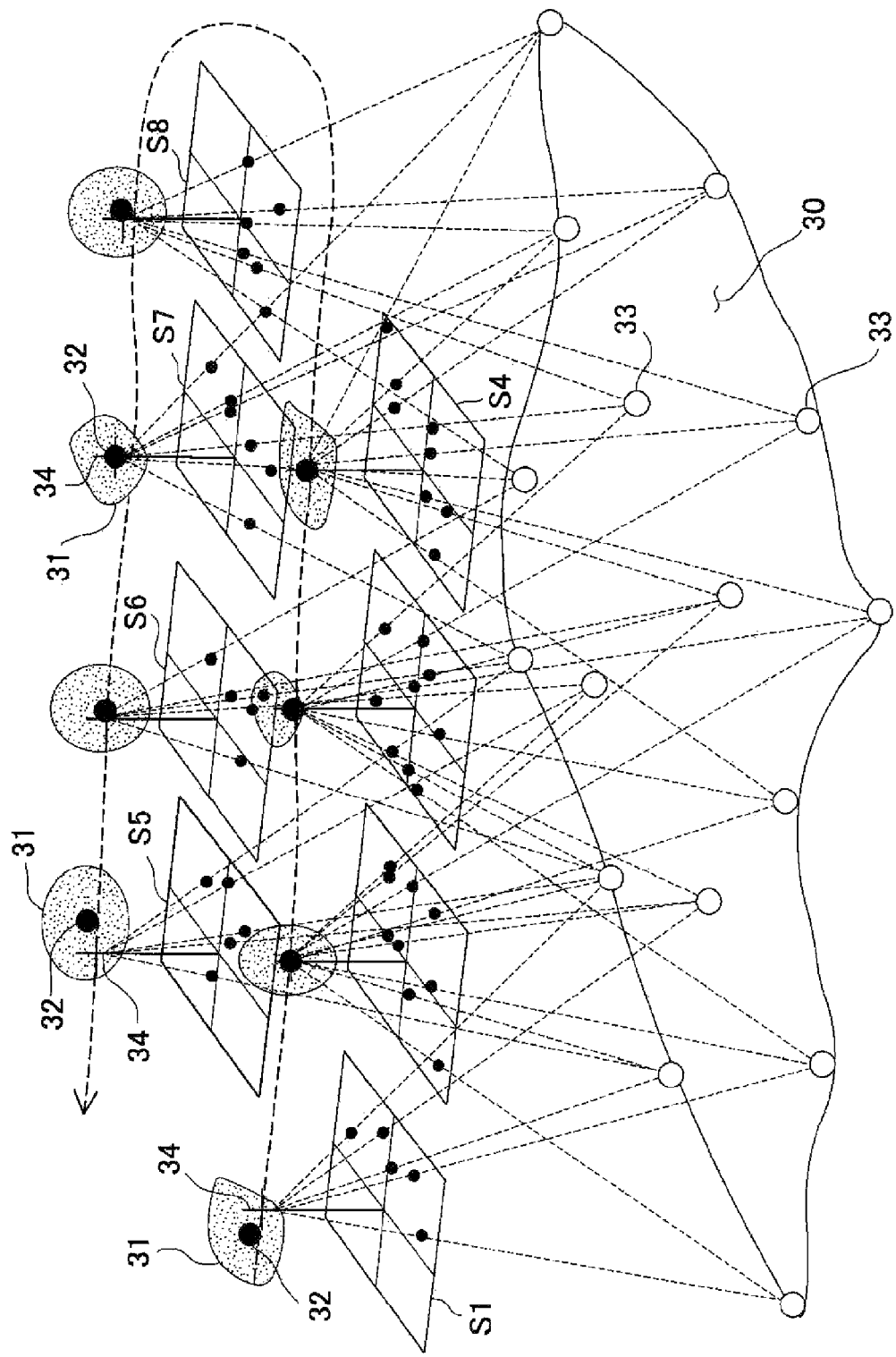
FIG. 9 is an explanatory drawing to show results of measurement of photographing points by a GPS device and average values of the results, and also, to show a relation with a photographing point obtained by bundle adjustment.

Referring to FIG. 9, description will be given below on the improvement of measurement accuracy of the GPS device 12 and on stabilization of the accuracy of the GPS data.

In the present embodiment, the helicopter 1 has hovering function. By acquiring the still images during hovering, many measurement values by the GPS device 12 can be obtained at a position to acquire the still image. It may be so arranged that many measurement values are obtained while moving at lower speed without being in perfect hovering.

In FIG. 9, reference numeral 31 represents an ellipse, which indicates a range including the results of measurement of the GPS device 12 at each of the positions to acquire the still images. In a case where there are high variations in the results of measurement, it is shown by a large ellipse (hereinafter referred as "error ellipse"). A small circle (i.e. a dot) shown in the error ellipse 31 indicates a GPS average value 32 of the measurement results by the GPS device 12.

Bundle adjustment is performed by using the GPS data of the unified stereo-image and the photographing position. For the bundle adjustment, model coordinates 33 of the object to be measured 30 are needed. From the unified stereo-image and from the unified three-dimensional coordinates, the model coordinates 33 of the object to be measured 30 are calculated. Further, based on the model coordinates 33, the photographing position is calculated by bundle adjustment calculation. The GPS average value 32 obtained by the bundle adjustment calculation is compared with a calculated position 34 obtained by the calculation. Then, the GPS average value 32, which is consistent with the calculated position 34 or within a predetermined threshold value is adopted as the photographing position. The GPS average value 32 with lower accuracy, is replaced with the calculated position 34 obtained by the bundle adjustment calculation. Further, the bundle adjustment calculation is performed, and the calculation is repeated until residual of the image coordinates will be decreased to the smallest value. The smallest residual is adopted as the photographing position.

Further, by using the model coordinates 33 (the model coordinates calculated from the unified stereo-image and from the unified three-dimensional coordinates) and the unified stereo-image, the photographing position is calculated again. The photographing position coordinates obtained by this re-calculation are compared with the GPS data of the photographing position, and the GPS data, which exceeds a predetermined threshold value, are exempted. The remaining GPS data obtained by this exemption are used as the photographing position measured by the GPS device 12, and this is reflected in the photographing position when the digital photogrammetry is performed, is reflected in the photographing position when the multi-image matching is performed (see FIG. 5) and is reflected in connection of the stereo-image.

Then, the unified stereo-image and the unified three-dimensional coordinates are obtained again. The accuracy of the model to be prepared is increased. Further, from the unified stereo-image thus determined again and the unified three-dimensional coordinates, the model coordinates 33 of the object to be measured 30 are calculated again. Further, the photographing position is re-calculated by the bundle adjustment calculation, and the measurement accuracy can be improved further.

Here, the term "bundle adjustment" means a method, by which object space (ground surface coordinates) and lens center and image coordinates projected on image sensor are associated by co-linearity condition expression and all luminous fluxes are obtained together.

Even when GPS measurement accuracy is low or unstable, the measurement accuracy of the GPS device 12 can be corrected with high accuracy, and the measurement with high accuracy can be accomplished by using the results of measurement of the real time kinematic GPS (RTK-GPS).

By referring to FIG. 10, description will be given now on a flow of the operation when the helicopter 1 is operated according to the flight schedule, and post-treatment is performed by using the image data obtained by photographing the object range of measurement and the data of the photographing position obtained by the measurement of the GPS device 12 the operation of preparation of common three-dimensional coordinate system (unified three-dimensional coordinates) and unified stereo-image (unified model), and the operation of check and correction of the GPS data. As for the data processing device to be used for the post-treatment, there is no special limitation, and general purpose personal computer may be used.

(Step 01 and Step 02) Among the data acquired, a first image is set up. For instance, referring to FIG. 3, the still image S1 of the course J=1 is set up, and the still image S1 is read as the left image.

(Step 03 and Step 04) Next, the right image S2 is read. From the portion of the still image S1 overlapped on the right image S2, feature points are extracted, and feature points are specified in the right image S2 by the moving image tracking.

(Step 05 and Step 06) Using the feature points of the still image S1 and the feature points specified in the right image S2 as orientation points, relative orientation is performed on left and right images.

(Step 07 and Step 08) Relative orientation is performed sequentially on two images adjacent over time for all images in the course and for all courses. Each of the stereo-images obtained by relative orientation, coordinate conversion is performed based on the tie point between the stereo-images adjacent to each other, and these stereo-images are connected.

(Step 09 and Step 10) Tie points are selected from the overlapped portion as to the images along the course. Based on the tie points, connection is performed, and a unified stereo-image including the entire range including all object to be measured is prepared.

(Step 11 and Step 12) The photographing position as measured by the GPS device 12 are read and checked, and average values of the result of measurement on each of the measurement positions are calculated.

(Step 13 and Step 14) For the average values of each measurement result, coordinates (the model coordinates) of the points required of the object to be measured 30 are determined according to each average value. Further, based on the model coordinates, the bundle adjustment is performed, and the photographing position (bundle initial value) is calculated.

(Step 15 and Step 16) The bundle adjustment results are compared with the average value, and the average values with lower accuracy are deleted.

(Step 17 and Step 18) Re-bundle adjustment is performed until the error between the bundle adjustment result and the average value is turned to the minimum. When the error is turned to the minimum, absolute orientation of the unified stereo-image is performed in the geocentric coordinate system according to the coordinates of the photographing position obtained from the results of the bundle adjustment.

In the embodiment as described above, coordinate conversion to the geocentric coordinates of the unified stereo-image obtained by relative orientation is performed based on three-dimensional coordinates of the photographing point measured by the GPS device 12 as the geocentric coordinates. However, it may be so arranged that reference points already known in the geocentric coordinate system may be set up in the object to be measured 30 and coordinate conversion to the geocentric coordinates of the unified stereo-image is performed based on the reference points.

When the reference points are set up, which are already known in the geocentric coordinate system, to the object to be measured 30, the bundle adjustment is carried out by using the reference point, and the photographing position is determined by the bundle adjustment after the data processing from Step 01 to Step 10 in FIG. 10 has been completed.

The invention claimed is:

1. An aerial photograph image pickup method, comprising a first step of acquiring still images along an outward route and a return route respectively when a flying object flies in meandering manner up in the sky over an object range to be measured, a second step of preparing a stereo-image by relative orientation on one set of images adjacent to each other with regard to three images adjacent to each other in advancing direction, and of preparing another stereo-image by relative orientation on one more set of adjacent images and of preparing two sets of stereo-images, a third step of connecting two sets of stereo-images by using feature points extracted from a portion of an image common to two sets of stereo-images and the portion is an overlapped portion of said three images all together, a step of connecting all stereo-images in outward route direction and in return route direction according to images acquired in the first step by repeating the procedures of the second step and the third step, a step of selecting common tie points from the images adjacent to each other in the adjacent course and of connecting the adjacent stereo-images in the course, wherein prepares an unified stereo-image which covers the entire object range to be measured and is represented by common three-dimensional coordinate system.

2. The aerial photograph image pickup method according to claim 1, wherein an overlapping ratio overlapped in advancing direction is 70% to 90%, and a sidelapping ratio overlapped between the courses adjacent to each other is 40% to 60%.

3. The aerial photograph image pickup method according to claim 1, wherein feature points extracted from a still image are identified in an adjacent still image by the moving image tracking.

4. The aerial photograph image pickup method according to claim 1, wherein multi-image matching is performed on three images adjacent to each other along a course, and a stereo-image in the adjacent course is connected.

5. The aerial photograph image pickup method according to claim 1, wherein a still image photographing position is measured by a GPS device, model coordinates of a predetermined point on an object to be measured are determined based on coordinate value obtained by the measurement and based on said unified stereo-image, and the coordinate value obtained by the measurement is corrected by bundle adjustment based on the model coordinates and on said unified stereo-image.

6. The aerial photograph image pickup method according to claim 5, wherein said flying object has hovering function, the still image is acquired in hovering condition, a multiple of measurement values are acquired by said GPS device, and said coordinate value is an average of the measured values.

7. The aerial photograph image pickup method according to claim 5, wherein, for correction of said coordinate values, a photographing position is calculated by using said model coordinates, and a measured value within a predetermined threshold value is selected by comparing with the measured value of said GPS device at said photographing position, and calculation is carried out by using the measured value thus selected.

8. An aerial photograph image pickup apparatus, comprising a flying object, a GPS device provided on said flying object, an image pickup device for taking an image below said flying object, and a control device for controlling the flight of said flying object and for controlling image pickup of said image pickup device, wherein said control device controls said flying object to fly in meandering manner and controls said image pickup device to acquire still images in an outward course and in a return course and controls so that the images have a predetermined overlapping ratio in advancing direction, and so that the image has a predetermined sidelapping ratio between the courses adjacent to each other, and a still image pickup position is measured by said GPS device, and results of measurement are acquired by associating with the still images.

9. The aerial photograph image pickup apparatus according to claim 8, wherein said control device controls said flying object in hovering condition where the still images are acquired, and a multiple of results of measurement can be acquired on the image pickup position by said GPS device.

10. The aerial photograph image pickup apparatus according to claim 8 or 9, further comprising a data processing device, wherein said data processing device prepares stereo-images by sequentially performing relative orientation based on two images adjacent to each other in advancing direction, connects two sets of stereo-images by using feature points extracted from a portion of an image common to adjacent stereo-images which is an overlapped portion of three images constituting both of said stereo-images, selects tie points from an overlapped portion of the images adjacent to each other in an adjacent course, connects an adjacent stereo-image along the course based on a tie point, and prepares a unified stereo-image which covers the entire object range to be measured and is represented by a common three-dimensional coordinate system.

* * * * *